July 5, 1966  S. WAY ETAL  3,259,767
ELECTRODE PROTECTION FOR MAGNETOHYDRODYNAMIC GENERATORS
Filed July 13, 1962

WITNESSES
Bernard R. Gieguey
James T. Young

INVENTORS
Stewart Way, William E. Young
and Richard L. Hundstad.
BY
F. P. Lyle
ATTORNEY 3,259,767
ELECTRODE PROTECTION FOR MAGNETOHY-
DRODYNAMIC GENERATORS
Stewart Way and William E. Young, Churchill Borough,
and Richard L. Hundstad, Forest Hills Borough, Pa.,
assignors to Westinghouse Electric Corporation, East
Pittsburgh, Pa., a corporation of Pennsylvania
Filed July 13, 1962, Ser. No. 209,602
2 Claims. (Cl. 310—11)

The present invention relates to apparatus for protection of electrodes, and more particularly to apparatus for protection of electrodes in magnetohydrodynamic energy conversion apparatus.

The conventional process of generating electrical energy comprises moving metallic conductors through a magnetic field. Usually, the energy conversion is from thermal to mechanical to electrical energy. Electrical energy can also be generated by moving fluid conductors in a magnetic field. However, in order to achieve a direct energy conversion, thermal to electrical, it is necessary to use a gas in order to realize an appreciable volume change. Large amounts of electrical energy may be efficiently generated through the use of magnetohydrodynamic (MHD) techniques. A magnetohydrodynamic generator utilizes an electrically conducting working fluid, generally a combustion product gas, which is thermally ionized and seeded with an alkali metal to make the gas more conductive. The ionized gas is then passed through a transverse magnetic field. Current collecting electrodes are disposed along the flow of the ionized working fluid to collect current that is generated due to the movement of the electrically conducting gas through the magnetic field. The general theory and operation of a magnetohydrodynamic generator is fully described in copending application entitled Magnetohydrodynamic Generator Apparatus, Serial No. 202,714, filed June 15, 1962, now Patent No. 3,214,615, by Stewart Way and assigned to the same assignee as the present invention. As disclosed in the above copending application, in order to obtain an efficient cycle of operation without excessive length, it is necessary that the thermally ionized gas be maintained in a state of high electrical conductivity. Thus, the gas must be kept at a high temperature of the order of 2500° K. Using combustion product gases, which contain an appreciable fraction of oxygen, perhaps 5%, as well as carbon dioxide and water, due to dissociation, gives rise to the problem of electrode durability. This problem arises since most materials which are electrical conductors and are able to withstand temperatures of 4000 to 5000° F. are also oxidizable.

In a MHD device which has carbon or carbon compound electrodes and uses hot combustion product gases as its thermally ionized working fluid, the electrodes are short-lived. This is due to the oxidizing reactions which take place on the surface of the electrodes. A few of these reactions which would remove carbon from the electrodes are:

$$C+O_2 \rightarrow CO_2$$
$$2C+O_2 \rightarrow 2CO$$
$$C+CO_2 \rightarrow 2CO$$
$$2C+2H_2O \rightarrow 2H_2+2CO$$

One solution might be to use oxide electrodes, such as zirconium oxide, but other problems then come into play such as the making of external circuit connections to the hot zirconium oxide.

It is therefore an object of the present invention to provide new and improved magnetohydrodynamic energy conversion apparatus in which means are incorporated to protect the electrodes from oxidation.

It is a further object of the present invention to provide new and improved magnetohydrodynamic thermal to electrical energy conversion apparatus in which means are incorporated to protect the electrodes by providing continuously a layer of protective material to the electrodes.

Broadly, the present invention provides magnetohydrodynamic apparatus in which a thermally ionized working fluid is utilized. Upstream of the current collecting electrodes, disposed adjacent to the flow of working fluid, are placed feeding means. The feeding means provide a protective material, which is carried by the flow of working fluid and serves to provide a protective layer for the electrodes.

These and other objects will become more apparent when considered in view of the accompanying specifications and drawings, in which.

Figure 1:
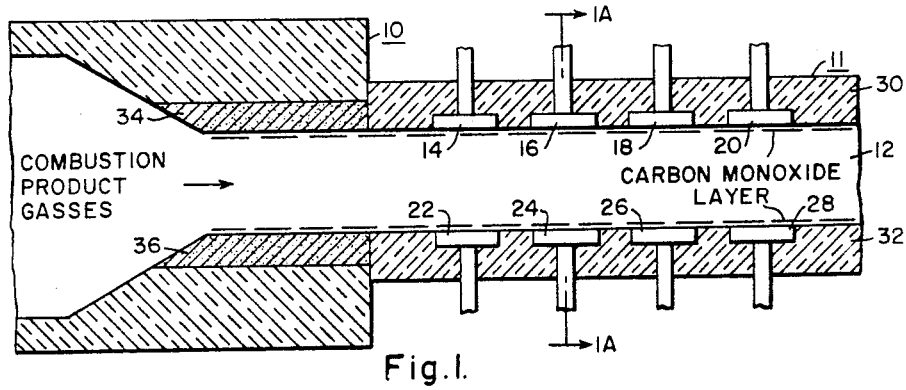
FIGURE 1 is a sectional view along the center line of one embodiment of the present invention.
Figure 1A:
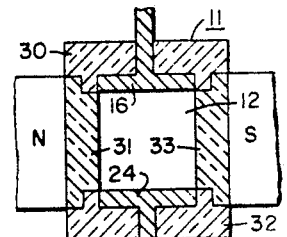
FIG. 1A is a sectional view taken along line 1A—1A of FIG. 1.

Referring to FIGURES 1 and 1A, the combustion product gases, as the working fluid, pass from the mixing chamber 10 into the generator chamber 11 through the duct 12. Disposed along the generator duct 12 are the electrodes 14, 16, 18, 20, 22, 24, 26 and 28. Only four pairs of electrodes are shown, however, a larger or smaller number of pairs could be used. The electrodes may comprise an electrically conducting material, such as graphite. Also, tungsten, tantalum or other refractory metals could be used. The wall members 30 and 32 comprise an insulating material, such as cooled magnesium oxide or zirconium oxide which insulate the electrodes from each other and serve as the wall members for the generator duct 12. The insulating side wall members 31 and 33 provide the other boundaries for the duct 12. The magnetic pole members N and S are disposed about the wall members 31 and 33 and provide a transverse magnetic field to the flow of working fluid through the duct 12. The electrodes used in this embodiment are oxidizable and will erode or deteriorate due to the flow of the combustion product gases, containing oxygen, as the gases pass over the electrodes at high temperatures. The deterioration of the electrodes, if they are graphite, causes carbon to be worn away from the electrodes, and so after a time necessitate their replacement. To prevent the gradual deterioration of the electrodes, the graphite members 34 and 36 are disposed along the generator duct 12 between the mixing chamber 10 and the generator chamber 11. The members 34 and 36 may comprise graphite, which contains large amounts of carbon. As combustion products pass over the members 34 and 36 substantial amounts of carbon are introduced into the flow of gas. Thus carbon monoxide is produced which flows along the inner walls of the duct 12 to provide a protective layer of carbon monoxide over the electrodes. Thus, the combustion product gases flowing past the members 34 and 36 oxidize them, and the carbon in them combines with the oxygen in the combustion products gas to form carbon monoxide. A carbon monoxide layer serves to protect the electrodes from oxidation, but still provides a conductive path at operating temperatures to the electrodes. The members 34 and 36 would be replaceable periodically.

Figure 2:
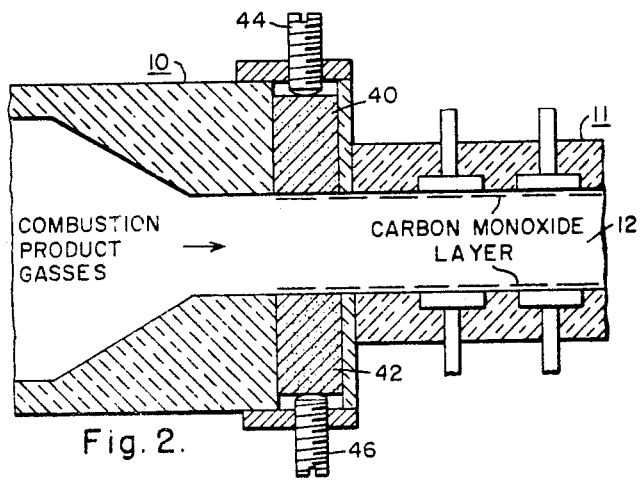
FIG. 2 is a sectional view along the center line of another embodiment of the present invention.

In FIG. 2 graphite rods 40 and 42, which may be less massive than the members 34 and 36 are used. The rods 40 and 42 are progressively advanced into the flow of working fluid so that carbon is continually provided therefrom. The set screws 44 and 46, or any other well known means, may be used to advance the rods 40 and 42 into the flow. The advantage of this embodiment would be that a more or less steady flow of carbon would be provided to the flow as compared to the gradual wearing away of the graphite members 34 and 36 in FIG. 1. The other components of FIG. 2 are substantially the same as those of FIG. 1.

Figure 3:
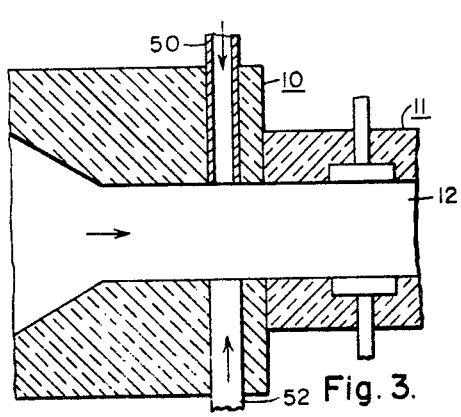
FIG. 3 is a sectional view along the center line of still another embodiment of the present invention.

FIG. 3 provides substantially the same structure as FIGS. 1 and 2, however, feeding orifices 50 and 52 are provided which are open into the duct 12. The two embodiments discussed above operate on the theory that the destruction of graphite causes a partial oxidation to take place at the surface and thus introduces free carbon monoxide into the flow of working fluid while at the same time consuming the oxygen. As an alternative method of supplying carbon to the working fluid, powdered graphite may be blow with an inert gas such as helium or argon through the orifices 50 and 52 into the duct 12; thus providing a layer of carbon monoxide as the free carbon combines with oxygen in the combustion product gases. Also carbon producing liquids, such as benzine, propane or octaglycolnitrate, can be used, which when introduced into the hot flow of working fluid ignite and through decomposition and partial combustion produce soot. The soot containing particles of free carbon combines to form carbon monoxide which serves as a protective layer for the electrodes downstream.

Figure 4:
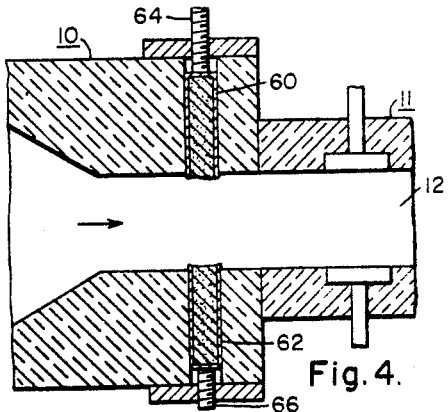
FIG. 4 is a sectional view along the center line of still another embodiment of the present invention.

FIG. 4 shown the tubular members 60 and 62 disposed upstream from the electrodes and opening into the duct 12. Into the tubes 60 and 62 is packed finely divided carbon, such as lamp black. The set screws 64 and 66 are provided to advance the tubes 60 and 62 into the duct 12. The tubular members 60 and 62 may comprise a metal such as aluminum which will vaporize when introduced into the hot flow of combustion product gases. As the tubular members 60 and 62 vaporize, the powdered carbon will be introduced into the flow and there combine to form carbon monoxide, which is carried along the flow of working fluid to serve as a protective layer for electrodes downstream. As an alternative to advancing the entire tubular members 60 and 62 into the flow, the powdered carbon within the tubular member may be advanced into the flow of working fluid rather than advancing the entire tubular member.

While utilizing the embodiment of FIG. 4, additional seeding may be added to the flow of working fluid, thereby increasing the conductivity of the gases surrounding the cooler regions adjacent to the electrode surfaces. To provide the seeding, a potassium compound, in powdered form, could be mixed with the lamp black. Also mixtures of lamp black with cesium could be used in order to produce better ionization of the working fluid in the relatively cool regions of the generator duct. In other respects, the structure of the embodiment of FIG. 4 is substantially the same as the above structures of FIGS. 1, 2 and 3.

Although the present invention has been described with a certain degree of particularity, it should be understood that the present disclosure has been made only by way of example and that numerous changes in the details of construction, the materials used and the combination and arrangement of parts may be resorted to without departing from the scope and spirit of the present invention.

We claim as our invention:

1. In magnetohydrodynamic thermal to electrical energy conversion apparatus operative with a flow of working fluid containing combustion gas products, the combination of: a generator member having a duct through which said flow of working fluid may pass; a plurality of electrically conducting electrodes disposed along said duct adjacent said flow of working fluid; and feeding means including feeding members and advancement means, said feeding members comprising carbon being disposed adjacent said flow of working fluid upstream of said electrodes in order to provide a protective layer to said electrodes, and said advancement means being operatively connected to said feeding members to progressively advance said feeding members into said flow of working fluid.

2. In magnetohydrodynamic thermal to electrical energy conversion apparatus operative with a flow of working fluid containing combustion gas products, the combination of: a generator member having a duct through which said flow of working fluid may pass; a plurality of electrically conducting electrodes disposed along said duct adjacent said flow of working fluid; and feeding means including tubular members containing a protective material comprising carbon and advancement means, said tubular members being disposed adjacent said flow of working fluid upstream of said electrodes in order to provide a protective layer to said electrodes, and said advancement means being operatively connected to said tubular members to progressively advance the protective material comprising carbon into said flow of working fluid.

References Cited by the Examiner

UNITED STATES PATENTS

| 2,658,332 | 11/1953 | Nicholson | 253—39.1 X |
| 2,964,678 | 12/1960 | Reid | 315—111 |
| 3,099,131 | 7/1963 | Rosa | 60—35.3 |
| 3,106,061 | 10/1963 | Eder | 60—35.55 |
| 3,170,077 | 2/1965 | Blackman | 310—11 |

FOREIGN PATENTS 841,613   6/1952   Germany.

OTHER REFERENCES

Publication: MHD-future power process: by Sporn and Kantrowitz in Power, November 1959, pp. 62–65.

MILTON O. HIRSHFIELD, *Primary Examiner.*

DAVID X. SLINEY, ORIS L. RADER, *Examiners.*